G. MIDBOE & C. C. PITTMAN.
INTERNAL COMBUSTION ENGINE.
APPLICATION FILED MAY 27, 1914. RENEWED SEPT. 15, 1916.

1,261,264.

Patented Apr. 2, 1918.
6 SHEETS—SHEET 1.

WITNESSES

INVENTORS
GABRIEL MIDBOE
CLOVIS C. PITTMAN
BY
ATTORNEYS

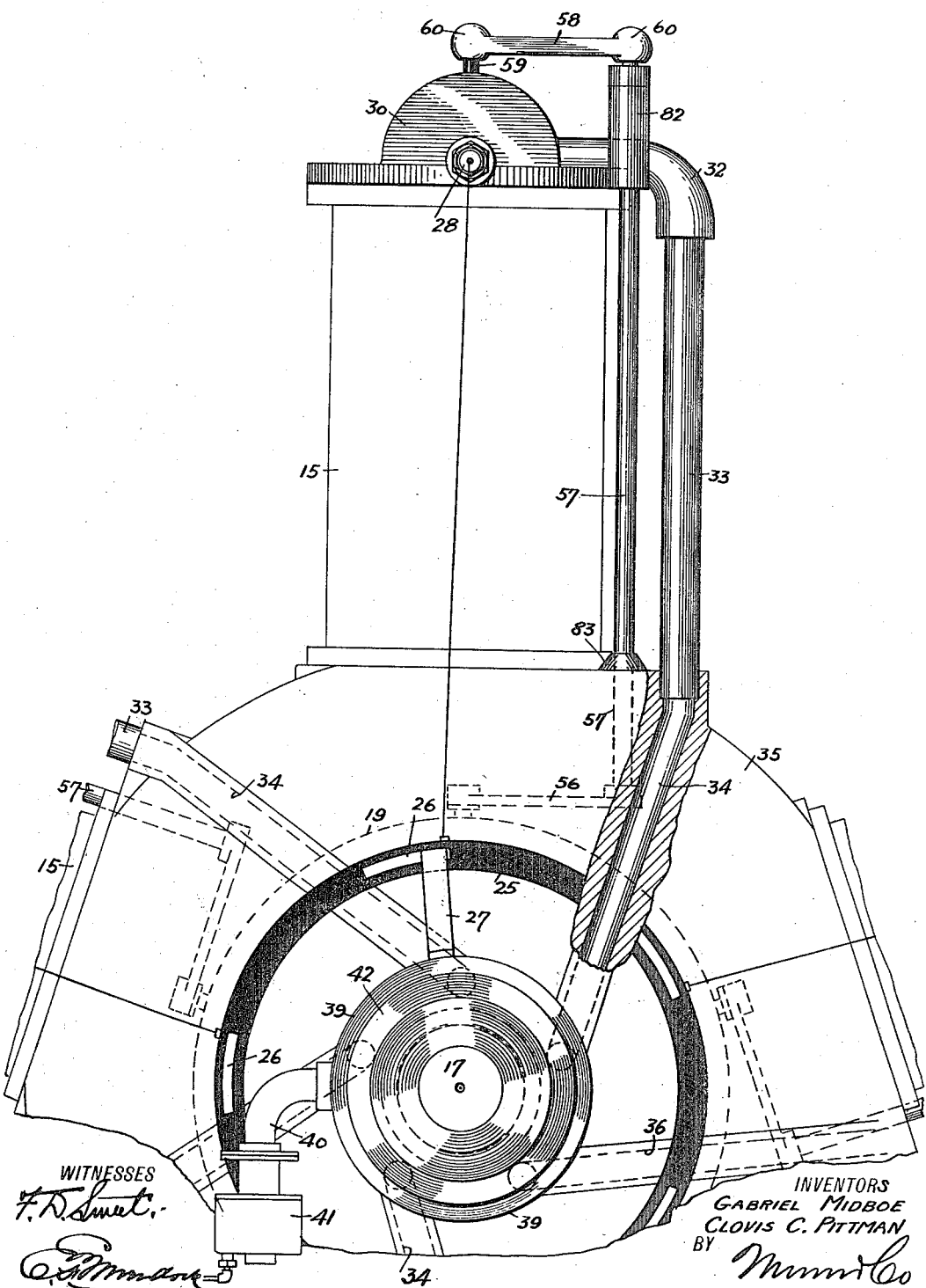

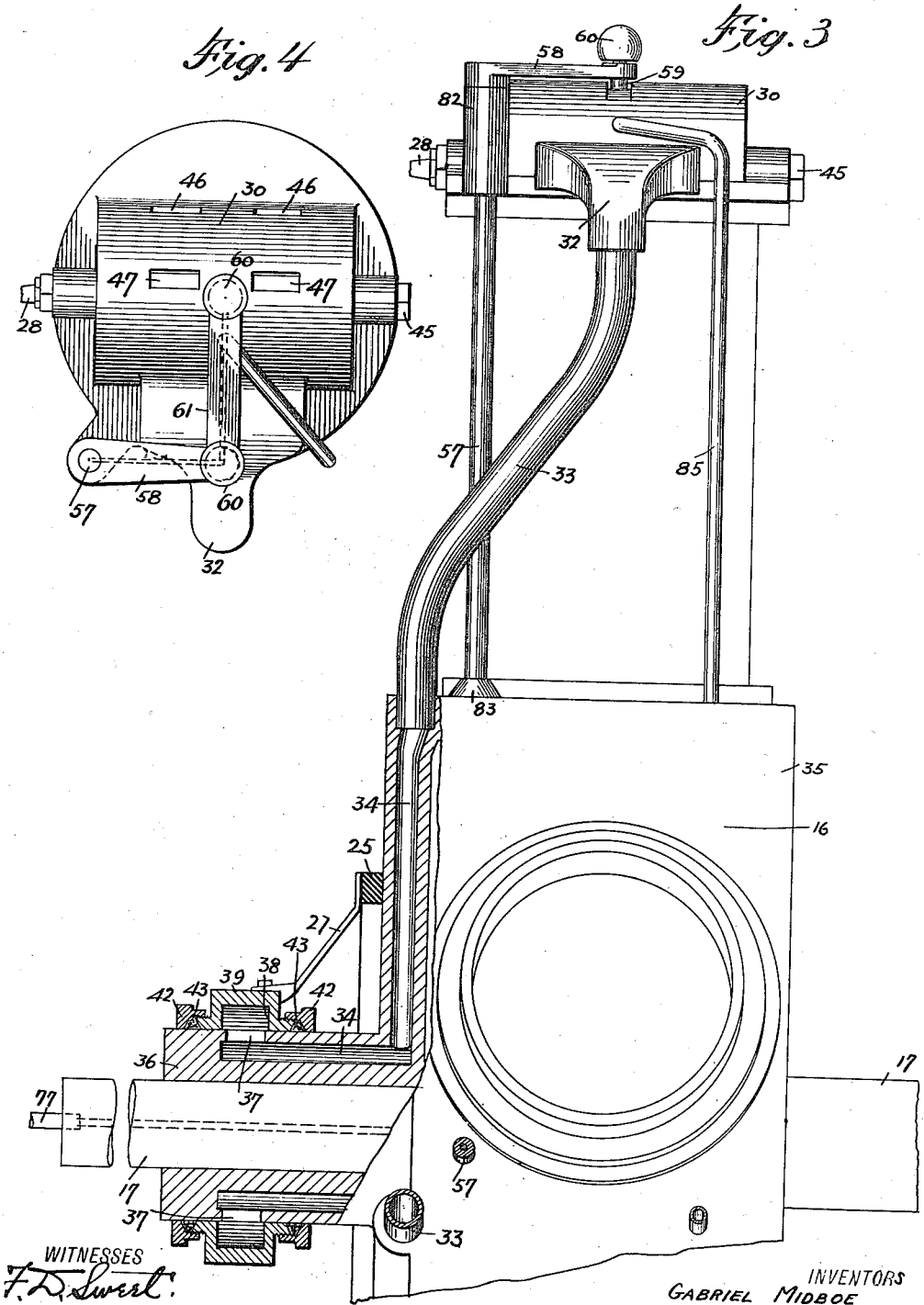

G. MIDBOE & C. C. PITTMAN.
INTERNAL COMBUSTION ENGINE.
APPLICATION FILED MAY 27, 1914. RENEWED SEPT. 15, 1916.
1,261,264.
Patented Apr. 2, 1918.
6 SHEETS—SHEET 4.
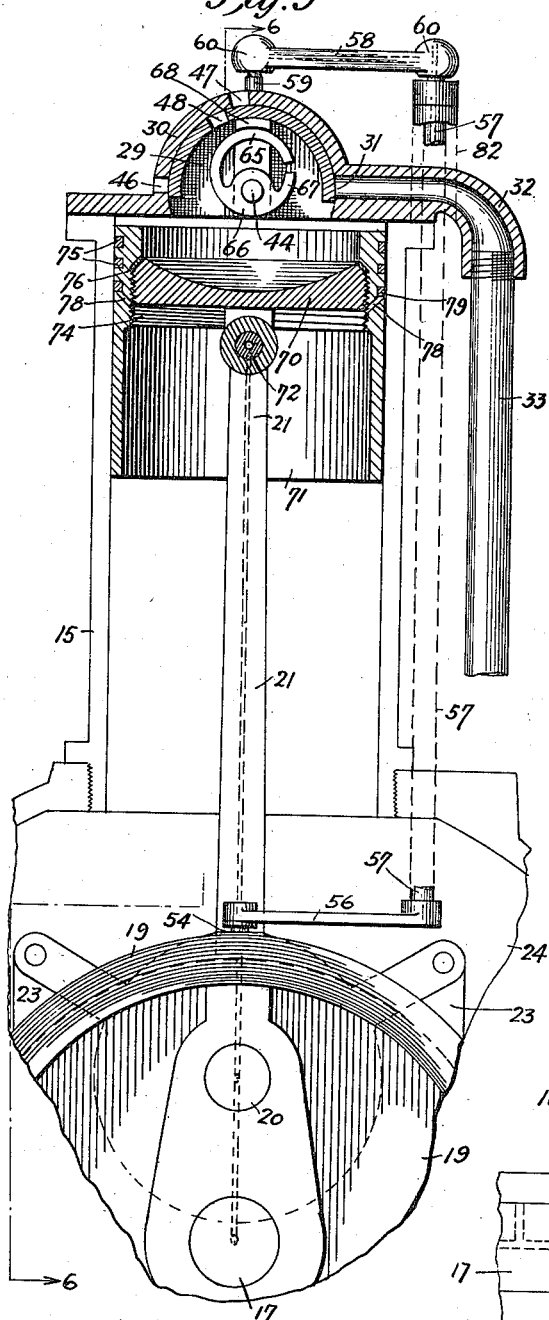
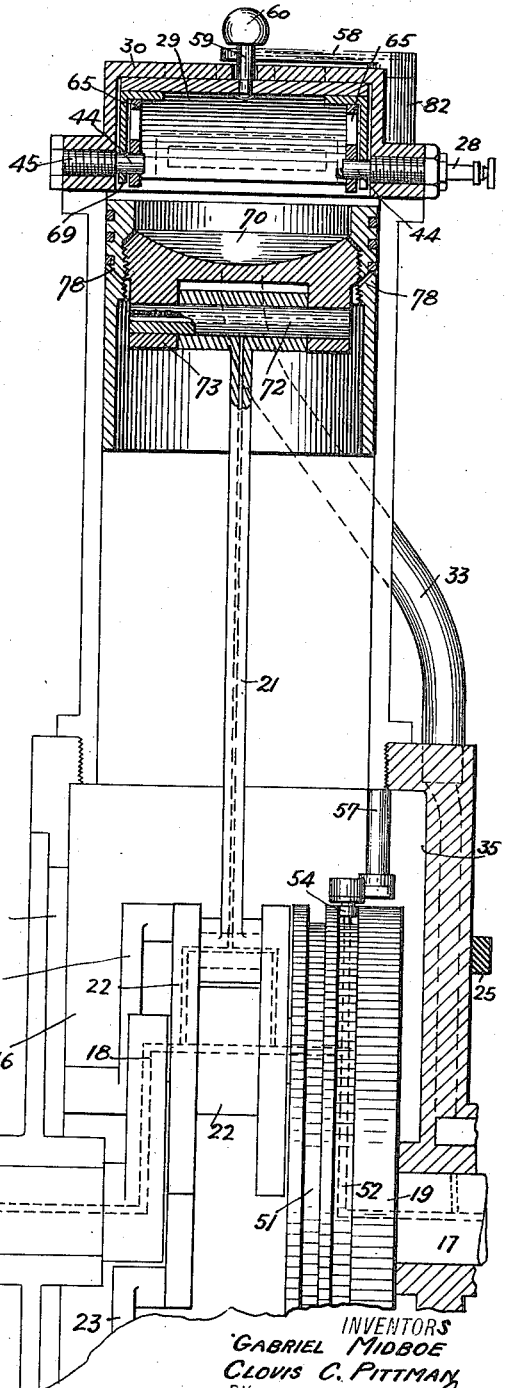
WITNESSES
INVENTORS
GABRIEL MIDBOE
CLOVIS C. PITTMAN
BY
ATTORNEYS G. MIDBOE & C. C. PITTMAN.
INTERNAL COMBUSTION ENGINE.
APPLICATION FILED MAY 27, 1914. RENEWED SEPT. 15, 1916.
1,261,264.
Patented Apr. 2, 1918.
6 SHEETS—SHEET 5.
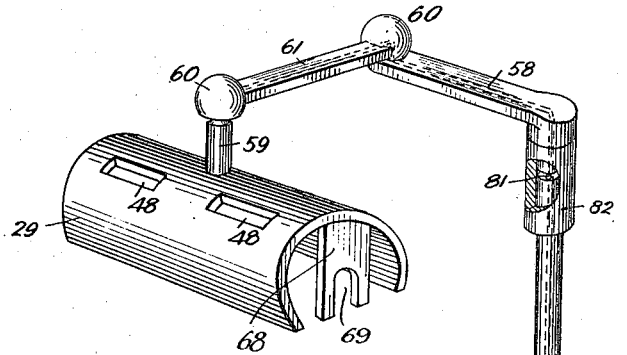
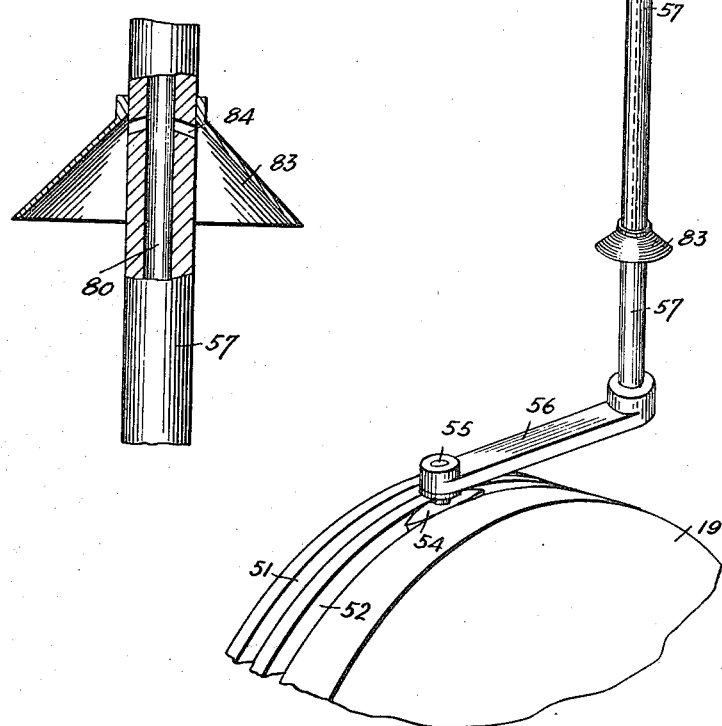
WITNESSES
INVENTORS
GABRIEL MIDBOE
CLOVIS C. PITTMAN
BY
ATTORNEYS G. MIDBOE & C. C. PITTMAN.
INTERNAL COMBUSTION ENGINE.
APPLICATION FILED MAY 27, 1914. RENEWED SEPT. 15, 1916.
1,261,264.
Patented Apr. 2, 1918.
6 SHEETS—SHEET 6.
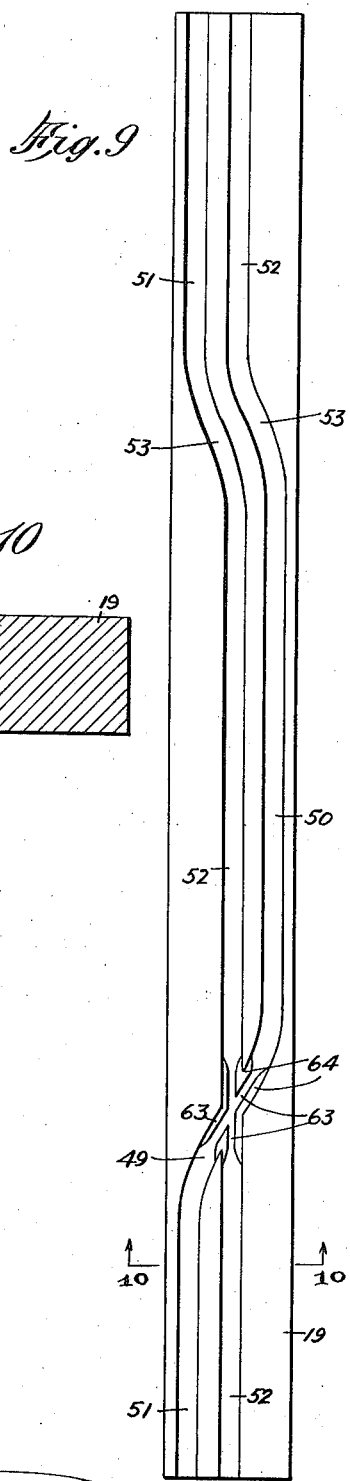
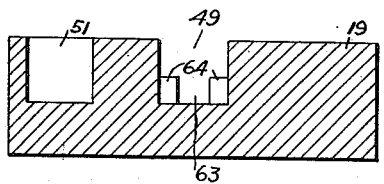
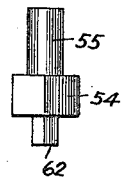
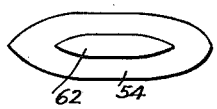
INVENTORS
GABRIEL MIDBOE
CLOVIS C. PITTMAN
BY
ATTORNEYS

UNITED STATES PATENT OFFICE.

GABRIEL MIDBOE AND CLOVIS C. PITTMAN, OF NEW YORK, N. Y., ASSIGNORS TO RICHARD P. LYDON, OF NEW YORK, N. Y.

INTERNAL-COMBUSTION ENGINE.

1,261,264.  Specification of Letters Patent.  Patented Apr. 2, 1918.

Application filed May 27, 1914, Serial No. 841,229. Renewed September 15, 1916. Serial No. 120,422.

*To all whom it may concern:*

Be it known that we, GABRIEL MIDBOE, a citizen of the United States, and a resident of the city of New York, borough of Manhattan, in the county and State of New York, and CLOVIS C. PITTMAN, a citizen of the United States, and a resident of the city of New York, borough of the Bronx, in the county of Bronx and State of New York, have invented a new and Improved Internal-Combustion Engine, of which the following is a full, clear, and exact description.

Among the principal objects which the present invention has in view are: to provide a simplified and improved valve and operating mechanism therefor; to provide an engine of the character mentioned with composite pistons arranged to lighten and coincidentally strengthen the structure of the pistons; to provide a fuel distribution applicable to a rotary engine; to provide an oiling system adapted to distribute the oil by centrifugal action; and generally, to improve and simplify the construction and the details thereof.

*Drawings.*

Fig. 2 is a side elevation, on an enlarged scale, showing a fragment of the engine disclosed in Fig. 1;

Fig. 3 is a side or edge view of the construction shown in Fig. 2;

Fig. 4 is a top plan view of the head of one of the cylinders employed in the herein-described engine;

Fig. 5 is a vertical cross section of a fragment of a rotary engine constructed and arranged in accordance with the present invention, showing partly the head and piston of one of the power units of the engine, and the means for operating the controlling valve for said unit;

Fig. 6 is a longitudinal section taken as on the line 6—6 in Fig. 5;

Fig. 7 is a detail view in perspective, showing the rocking valve employed in the present invention, and a portion of the operating mechanism therefor;

Fig. 8 is a detail view, on an enlarged scale, partly in section, showing one of the oil collectors and feeding conduits therefor employed in oiling the crank arms of the rocking shafts;

Fig. 9 is a view showing in platted arrangement the periphery of the cam disk;

Fig. 10 is a cross section, on an enlarged scale, taken as on the line 10—10 in Fig. 9;

Fig. 11 is a vertical edge view of a rider device for rocking the valve-operating shaft with which the present engine is provided;

Fig. 12 is a bottom view of the same.

*Description.*

Figure 1:
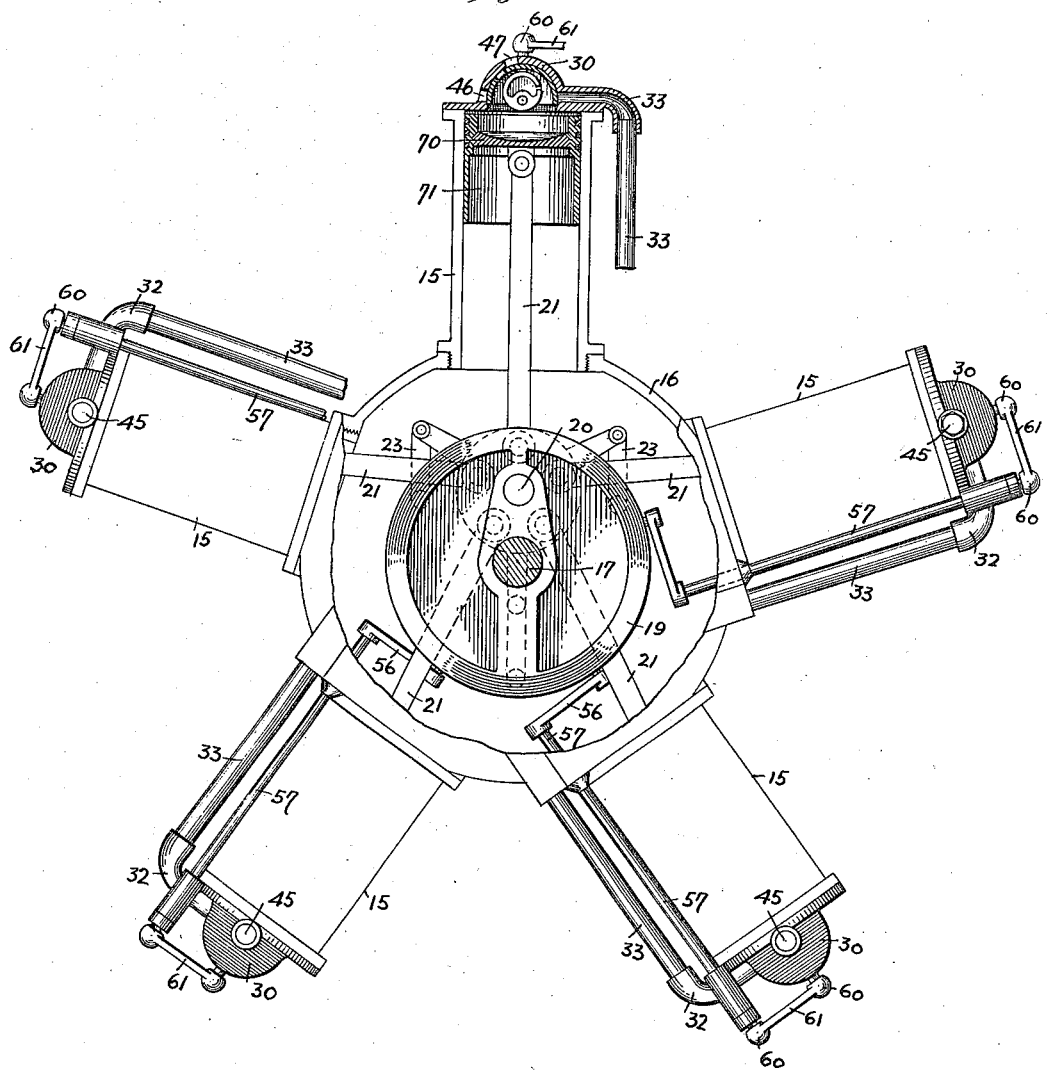
Figure 1 is a side elevation, partly in section, of a rotary engine constructed and arranged in conformity with the present invention.

The invention is disclosed in the accompanying drawings as applied to a rotary type of internal combustion engines, and further, to a type employing a plurality of power cylinders 15. Said cylinders are grouped about a circular crank case 16, being radially disposed thereto.

In the preferred form of engine, the frame and cylinders connected therewith revolve about a stationary shaft 17. The shaft 17 is rigidly provided with a crank arm 18 and a circular disk 19, which disk forms one of the supports for the crank pin 20, the offset of which from the shaft 17 governs the extent of stroke of the piston rods 21. The piston rods 21 are severally connected with the pistons in the cylinders 15, and with a connecting block 22.

As disclosed in a co-pending application for patent on improvements in internal combustion engines, filed by Gabriel Midboe, No. 835,138, on the 29th day of April, 1914, the block 22 is held in non-rotative relation to the crank case 16 by pivot links 23. The links 23 are pivotally mounted upon the face plate 24 of the engine. The links 23, as disclosed in the application to which cross reference is here made, operate to maintain constant the relation of the crank case 16 and the block 22, the object being, as stated, to dispose each of the piston rods 21 and the piston connected therewith in predetermined and similar positions relative to a fixed point in the path of the engine, said point being preferably that which corresponds with the proper ignition of the fuel charges in the various cylinders. Said ignition is controlled primarily by a ring 25. The ring 25 is mounted on the outside of the crank case, and is provided with an insulating surface and bared sections 26, which a stationary wiper, such as 27, engages to close the circuit including the spark plug 28.

To control the supply of fuel to the explosion chambers of the various cylinders, there are provided rocking valves 29. A domed head 30 is provided for the engine, to hold said valves. Each of the domed heads 30 is furnished with a single intake port 31. The port 31 is formed in the inner end of a bend 32, said bend being curved and adapted to receive a supply pipe 33, the opposite end of which is mounted in a tubular passage 34 cast in the face-plate 35 and in the hub 36 of said face-plate. The passages 34 have each an outlet 37 opening continuously into an annular chamber 38 formed at the inner side of a distributing ring 39. The ring 39 is stationary, and is connected by means of a supply pipe 40, with a carbureter 41. To prevent the lateral escape of the fuel delivered to the chamber 38, the ring 39 is provided with gland collars 42, which are employed to compress packing rings 43 of conventional type.

The valves 29 are pivotally mounted on the pintle ends 44 of the screw bolt 45 and the inner end of the plug 28. The domed heads 30 are provided with exhaust ports 46 and 47. The valves 29 are provided with intermediate ports 48, adapted for registry with the ports 47 when the valves 29 are rocked on their centers. The purpose in providing the intermediate ports 48 is to augment the exhaust passages, the ports 48 registering with the ports 47 when the edge of the valve exposes the port 46. Both ports are closed when the valve rocks to expose the port 31, as is usual in the action of valves of this type.

To rock the valves 29 is the office of the disk 19, and particularly of the cam groove formed in the periphery thereof. The cam groove, as is best shown in Fig. 9 of the drawings, is continuous, and is arranged spirally, the ends of the spiral being connected by a short switch section 49. For convenience of description, the operative sections of the spiral groove are designated by the numerals 49, 50, 51, 52 and 53. Mounted to slide in said spiral groove are trailer blocks 54, the average width of which corresponds to the width of said groove. It will be understood that in the operation of the engine, the disk 19 is relatively stationary, and the blocks 54 travel around said disk, following the path of said groove. To this end, each block is provided with a stud shaft 55, to which is connected one of the crank arms 56. The crank arms 56 are each fixedly mounted upon and at the inner end of a rocking shaft 57, which shaft is suitably mounted in bearings in the engine frame, and is similarly provided at the upper end with a crank arm 58. Each crank arm 58 is operatively connected with one of the valves 29, and with the pins 59 with which each valve is provided. To flexibly unite the arms 58 and the pins 59 at the end of each arm and at the outer end of each pin, there is provided a ball member to fit sockets 60 at the ends of links 61.

As indicated above, the various cylinders gyrate about the disk 19. The immediate effect on the blocks 54 is that they are drawn by the shafts 57 and arms 56 through the groove sections 50, 51, 52, 53 and switch section 49. It is to control the blocks 54, when passing through the switch section 49, both when moving from the section 51 to the section 50, and between the sections 52, that each is provided with a fin 62. The width of each fin 62 corresponds with the width of the short switch channels 63, and the length of each fin is sufficient to bridge the gap of the cross-over of said channels. The channels 63 are formed by relatively low filling sections 64, shown best in Fig. 9 of the drawings, over which filling sections the bodies of the blocks pass, while the fins extend therebetween. By this arrangement, if the cross-over of the section 49 be indefinite, due either to carelessness of construction or subsequent wear, the blocks 54 are controlled to travel the predetermined path, and to smoothly and certainly take the switch.

To support the valves 29 in the heads 30, each is provided with central legs 68, as shown best in Fig. 7 of the drawings.

The lower ends of the legs 68 are each provided with a slot 69 to permit the pintles 44 to rest therein. In service, the slots 69 serve to support the valves when being installed and prior to the introduction of the spring disks 66. When the disks are installed, the spring sections 65 thereof lift the inner ends of the slots 69 slightly away from the pintles 44.

It will be understood that while the legs 68 are a convenience, they are not essential to the complete operation of the valves 29.

The pistons with which the rods 21 are connected move in harmony with the rocking of the valves 29. The preferred form of the invention, and that shown in the drawings, is that which is known as the four-cycle type, or that wherein the piston is reciprocated to eject the combusted gases preliminary to drawing into the cylinder a fresh fuel charge. The pistons employed in the present invention are each provided with a head 70, preferably constructed of material selected for the special use for which the head is employed, and with an apron 71 constructed from material selected for its adaptability to the uses for which it is employed. The piston pin 72 is directly connected to the head 70, having bearings formed in the ends of brackets 73 extending from the under face of the head 70. The head 70 is cupped, as best seen in Figs. 5 and 6 of the drawings, and is provided at its perimeter with screw threads to register with the threaded portion 74 of the apron 71.

From the foregoing, it will be seen, the materials composing the piston may be selected. If the selection be addressed to reducing the weight of the engine, it will be seen that a relatively light, ductile and strong material, such as the various forms of steel, may be utilized in forming the head 70, while a relatively light structure of cast-iron may be used to form the apron 71. By using steel or similar material for forming the cylinders 15, a result would be obtained giving the maximum strength with a minimum of weight and a reduction of friction.

To prevent leakage of gas past the piston, there is provided a series of packing rings 75, functioning to close the passage between the external surface of the apron 71 and the inner surface of the cylinder 15. To prevent possible escapement of gas between the head 70 and the apron 71, a suitable packing or gasket 76 is set between each head and its apron, as seen best in Figs. 5 and 6 of the drawings.

*Operation.*

With an engine thus constructed and arranged, the operation is as follows:—

The fuel is delivered by the carbureter 41 to the chamber 38, from whence it is drawn into the cylinders 15 by the suction of the pistons, and by way of the bend 32, the pipes 33, and the passages 34, when the valves 29 are rocked to expose the ports 31. After drawing the charge for its cylinder, each piston is moved outward toward the head 30 of its cylinder, to compress the fuel charge therein. During this action the valves 29 are closed, the shafts 57 controlling the same being held in the position shown best in Fig. 5, by the block 54 passing during this period through the section 52 of the disk 19. At the proper and predetermined moment of compression in each cylinder, the bared section 26 of the ring 25 engages the wiper 27 to complete the current in which is incorporated the plug 28, thus providing the spark for lighting the compressed charge.

The operation of the links 23 and block 22 which disposes each of the pistons and piston rods 21 connected therewith in identical position during the series of explosions, has been fully set forth in the companion application to which cross reference is here made.

Due to the relative fixity of the crank arm 18 and disk 19, the thrust of the pistons and the rods 21 thereof results in the gyration of the cylinders 15 around the shaft 17. The blocks 54 travel as described, through the spiral groove with which the disk 19 is provided, each rocking the shaft 57 and the valve 29 with which it is connected, to expose alternately the port 31, while closing the ports 46 and 47, and to expose the ports 46 and 47, while closing the port 31. The former position of the valve 29 occurs while the block 54 is in the section 50 of said spiral groove. At the end of the intake period, the block passes through the sharp, inclined section 53 to the medium section 52, closing all of the ports during the compression of the trapped fuel charge. At the desired moment, and while the block 54 is in the straight path or section 52 of said spiral groove, the explosion occurs, and the power stroke is inaugurated and consummated. At the end of the power stroke, the block 54 passes into the second inclined section, leading to the section 51, which rocks the shaft 57 and the valve 29 to open the ports 46 and 47. At the end of the stroke which ejects the combusted gases, the block 54 is transferred through the switch section 49 to the section 50, rocking the shaft 57 and the valve 29, to close the ports 46 and 47 and to open the port 31. From this point, the action above described is repeated.

To lubricate the various parts of the engine, the shaft 17 is suitably bored to provide the central passage which may be fed with lubricant, a feed pipe 77 being connected with a suitable supply. Lateral branches tapping the bore of the shaft 17 provide for lubricating the bearings of said shaft.

Adjacent the inner end of the bore, a vertical passage is formed in the crank arm 18 and in the disk 19, said passage communicating with the bore formed in said crank and disk for the crank pin 20. It will be remembered that the block 22 rotates on the pin 20. The lubricant is transferred from the crank pin 20 to the wrist-pins of the piston rods 21, said lubricant being transferred by centrifugal force. The supply of lubricant to the rotary members is sufficiently free to permit the same to be delivered therefrom outward toward the heads of the various cylinders by centrifugal action. The flowing or vaporized lubricant is caught within the aprons 71 and at the inner surface of the heads 70. At this point a variety of inclined passages, such as indicated by the numeral 78 in Figs. 5 and 6 of the drawings, are formed. The outer ends of the passages 78 coincide with the groove for one of the packing rings 79, the object being to saturate the ring with lubricant, to thereby transfer the same to the inner surface of each of the cylinders 15. In practice, it will be found that the lubricant passes to the outer end of each of the cylinders to lubricate that portion of each cylinder which constitutes what may be termed the explosion chamber. A certain proportion of the lubricant thus carried by centrifugal action to the heads of the various cylinders deposits the oil in the path of the valve 29 to lubricate the seat thereof.

To lubricate the connections of the links 61, the shaft 57 is bored lengthwise thereof to form a passage 80. Adjacent the upper end of said shaft, lateral passages 81 are provided to oil the upper bearings 82 provided for said shaft. Adjacent the lower end of the passage 80, the shafts 57 are provided with inverted hoods 83, arranged to arrest and accummulate the vaporized or atomized oil delivered from the working parts of the engine within the crank case, said accumulated lubricant being conveyed by the short, inclined, lateral passages 84 to the main passage 80 in said shafts 57.

The valve 29 is lubricated by oil transferred from the crank case 16 by means of a pipe 85. It has been found that the oil delivered to the interior of the crank case is thrown by centrifugal action induced by the engine, to the extremities thereof. The end of the pipe 85, being open to the crank case 16, has distributed to it in this way a certain proportion of the lubricant referred to. The pipe 85 lying generally in the direction of the lines of centrifugal force, the lubricant received therein is transferred to the outer end, where it extends through the head 30 to be deposited upon the top of the valve 29. The distribution of the oil on the valve 29 is incident to the rocking or working of said valve.

*Claims.*

1. An engine as characterized, comprising a power cylinder; a crank shaft; a fuel supply embodying a distributing chamber concentric with said shaft, and a supply pipe uniting said distributing chamber and the explosion chamber of said cylinder; a semi-cylindrical head for said cylinder in open communication with the combustion chamber thereof, said head being provided with an intake port and with a plurality of exhaust ports, said exhaust ports having an area in excess of the area of said intake port; a rocking valve mounted in said head, said valve having openings formed therein to register with one of said exhaust ports; a split ring spring supporting said valve; and means for rocking said valve in timed relation to the operation of the engine, said means embodying a disk concentric with said shaft, said disk having an endless spiral groove formed in the periphery thereof, a transmission rocking shaft extending between said valve and said disk, a trailer mounted in said groove, and crank arms connecting the ends of said shaft with said valve and said trailer, respectively.

2. An engine as characterized, comprising a power cylinder; a crank shaft; a fuel supply embodying a distributing chamber concentric with said shaft, and a supply pipe uniting said distributing chamber and the explosion chamber of said cylinder; a semi-cylindrical head for said cylinder in open communication with the combustion chamber thereof, said head being provided with an intake port and with a plurality of exhaust ports, said exhaust ports having an area in excess of the area of said intake port; a rocking valve mounted in said head, said valve having openings formed therein to register with one of said exhaust ports; a split ring spring support for said valve; and means operatively connected with said crank shaft for rocking said valve in timed relation to the operation of the engine, said means embodying a disk having an endless spiral groove formed in the periphery thereof, a transmission rocking shaft extending between said valve and said disk, a trailer mounted in said groove, crank arms connecting the ends of said shaft with said valve and said trailer, respectively, and a switch member mounted on said trailer to guide the same when passing between the sections of said groove.

3. An engine as characterized, comprising a power cylinder; a crank shaft; a fuel supply embodying a distributing chamber concentric with said shaft, and a supply pipe uniting said distributing chamber and the explosion chamber of said cylinder; a head for said cylinder having a cylindrical dome constructed to form a valve seat and to provide intake and exhaust ports for said cylinders; a rocking valve fitting said head, operable to expose and close said ports; and a split ring spring supporting said valve to hold the same on its seat.

4. An engine as characterized, comprising a power cylinder, a head for said cylinder in open communication with the combustion chamber thereof, said head provided with intake and exhaust ports, a valve mounted in said head, arranged to open and close said ports, and means for operating said valve in timed relation to the operation of the engine, said means employing a member provided with an endless spiral groove, a transmission rocking shaft extending between said valve and said member, a trailer in said groove, means connecting the ends of said shaft with said valve, and said trailer, respectively, and means located on said trailer to guide the same when passing between the sections of said groove.

5. An engine as characterized, comprising a power cylinder, a semi-cylindrical head for said cylinder in open communication with the combustion chamber thereof, said head being provided with intake and exhaust ports, said exhaust having an area in excess of the area of the intake, a rocking valve mounted in said head, said valve having an opening therein to register with one of said ports, means for rocking said valve in timed relation to the operation of the engine, said means embodying a disk having an endless spiral groove formed in the periphery thereof, a shaft extending between said valve and said disk, a trailer in said groove, means connecting the ends of said shaft with said valve and said trailer respectively, a switch member on said trailer to guide the same when passing between the sections of said groove.

6. An engine as characterized, comprising a power cylinder, a semi-cylindrical head for said cylinder in open communication with the combustion chamber thereof, said head being provided with intake and exhaust ports, said exhaust having an area in excess of the area of the intake, a rocking valve mounted in said head, said valve having an opening therein to register with one of said ports, means for rocking said valve in timed relation to the operation of the engine, said means embodying a disk having an endless spiral groove formed in the periphery thereof, a shaft extending between said valve and said disk, a trailer in said groove, means connecting the ends of said shaft with said valve and said trailer respectively, a switch member on said trailer to guide the same when passing between the sections of said groove and means located within said groove to guide said switch member.

7. In a rotary internal combustion engine, a power cylinder, a semi-cylindrical head therefor in open communication with said cylinder, intake and exhaust ports in said head, a valve member adapted to open or close said ports, means for operating said valve embodying an endless spiral groove, a trailer in said groove provided with a switch member, fixed means within said groove to engage the switch member of the trailer to guide the trailer from one portion of the groove to another and means for transmitting the motion of said trailer to said valve, so as to operate said valve in timed relation to the operation of the engine.

8. In an internal combustion engine, intake and exhaust ports, a valve member adapted to open or close said ports, means for operating said valve member embodying an endless spiral groove, a groove within said spiral groove, a trailer mounted in said spiral groove and provided with a switch member adapted to project into and be guided by said groove within said spiral groove and means for transmitting the motion of the trailer so as to operate said valve member.

9. In an internal combustion engine, a power cylinder, a head therefor in open communication with said power cylinder, intake and exhaust ports in said head, a valve member adapted to open or close said ports, means for operating said valve member embodying an endless spiral groove, a groove within said spiral groove, a trailer mounted in said spiral groove and provided with a switch member adapted to project into and be guided by said groove within said spiral groove and means for transmitting the motion of the trailer so as to operate said valve member.

10. In an internal combustion engine, a power cylinder, a head therefor in open communication with said power cylinder, intake and exhaust ports in said head, a valve member adapted to open or close said ports, means for operating said valve member embodying a fixed disk having on its periphery an endless spiral groove, a groove within said spiral groove, a trailer mounted in said spiral groove and provided with a switch member adapted to project into and be guided by said groove within said spiral groove and means for transmitting the motion of the trailer so as to operate said valve member.

11. In an internal combustion engine, intake and exhaust ports, a valve member adapted to open or close said ports, means for operating said valve member embodying an endless spiral groove arranged in divisions, one for each cycle of the engine, a trailer within said groove, separate fixed means within said groove to guide said trailer from one division to another of said groove in the proper order and means on said trailer for engaging with said fixed means.

12. In an internal combustion engine, intake and exhaust ports, a valve member adapted to open or close said ports, means for operating said valve member embodying an endless spiral groove arranged in divisions, one for each cycle of the engine, two of said divisions intersecting at a common point, a trailer within said groove, separate fixed means within said grooves at said point of intersection to guide said trailer from one division to another of said groove in the proper order and means on said trailer for engaging with said fixed means.

In testimony whereof we have signed our names to this specification in the presence of two subscribing witnesses.

GABRIEL MIDBOE.
CLOVIS C. PITTMAN.

Witnesses:
E. F. Murdock,
Philip D. Rollhaus.